J. C. BILSLAND.
HOE.
APPLICATION FILED JAN. 11, 1910.
975,320.
Patented Nov. 8, 1910.
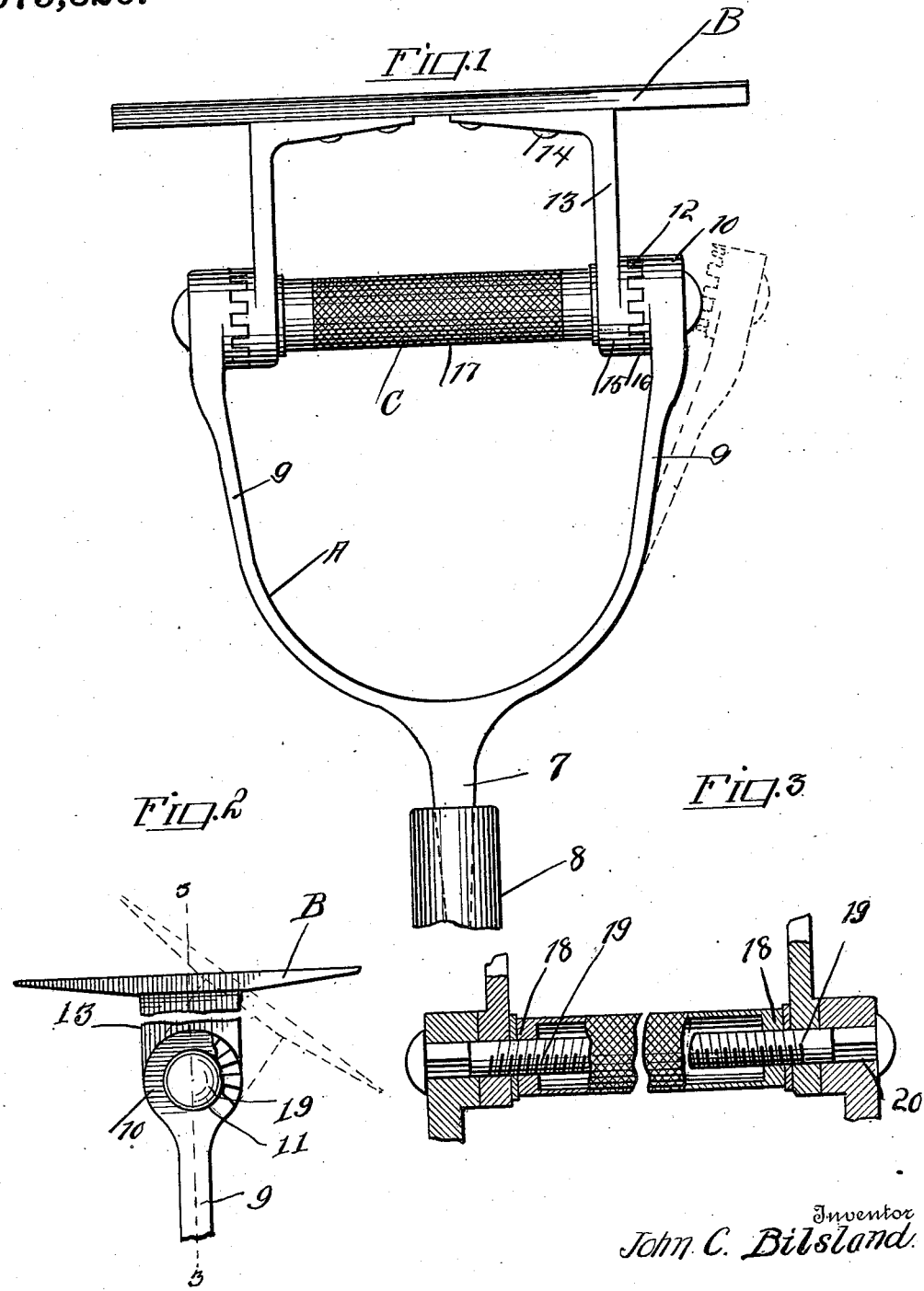
Witnesses
Wm Smith
Wm Bagger
Inventor
John C. Bilsland
By Victor J. Evans
Attorney

UNITED STATES PATENT OFFICE.

JOHN C. BILSLAND, OF AZUSA, CALIFORNIA, ASSIGNOR OF ONE-FOURTH TO JOHN MOONEY, OF LOS ANGELES, CALIFORNIA.

HOE.

975,320. Specification of Letters Patent. Patented Nov. 8, 1910.

Application filed January 11, 1910. Serial No. 537,426.

*To all whom it may concern:*

Be it known that I, JOHN C. BILSLAND, a citizen of the United States, residing at Azusa, in the county of Los Angeles and State of California, have invented new and useful Improvements in Hoes, of which the following is a specification.

This invention relates to hoes; and one object of the invention is to present a hoe of simple and improved construction which shall be adjustable to various angles with relation to the handle so that it may be easily and quickly converted into a chopping hoe or a push hoe as may be desired.

A further object of the invention is to provide improved connecting means whereby the hoe blade may be adjustably connected with the handle.

Still further objects of the invention are to simplify and improve the construction and operation of this class of devices.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention; it being however understood that no limitation is necessarily made to the precise structural details therein exhibited, but that changes, alterations and modifications within the scope of the invention may be resorted to when desired.

In the drawings: Figure 1 is a side elevation of a hoe constructed in accordance with the invention. Fig. 2 is a detail end view of the same. Fig. 3 is a sectional view taken on the plane indicated by the line 3—3 in Fig. 2.

Corresponding parts in the several figures are denoted by like characters of reference.

In the form of the invention illustrated in Figs. 1, 2 and 3, A designates a yoke of suitable dimensions having a prong 7 by means of which it may be connected with an ordinary handle, a portion of which has been shown at 8. The yoke A is preferably formed of metal such as steel possessing a degree of resiliency sufficient to enable the arms 9 of the yoke to spring outward or apart from each other, as indicated in dotted lines in Fig. 1, when relieved from pressure or tension. The arms 9 are formed with terminal enlarged portions 10 which are apertured as shown at 11 to form eyes, said eyes being provided upon their inner faces with teeth or serrations 12 that extend radially from the apertures 11.

B designates a suitably constructed hoe blade upon one side of which brackets 13 are secured by means of rivets 14 or other suitable fastening devices. The brackets 13 have terminal eyes 15 which are provided upon their outer faces with radially disposed teeth 16 adapted to engage and to interlock with the teeth 12 upon the eyes 10.

C designates a turn-buckle which has been shown as consisting of a tube that has been exteriorly milled or corrugated, as shown at 17 to form a good grip for the hand of the operator; said tube being provided at the ends thereof with right and left interior threads 18 engaging connecting bolts 19 that are inserted through the eyes 10 and 15; said bolts being right and left threaded as shown, and said bolts being also provided with non-circular portions 20 engaging correspondingly shaped seats in the eyes 10; the seats being part of the apertures 11.

It will be readily seen that when the parts of the device are assembled, the hoe blade may be adjusted at any desired angle with relation to the handle, it being retained in position by the interengaging teeth 12 and 16 which are held securely in engagement by the connecting bolts, the parts being tightened by turning the turn-buckle in the proper direction. To readjust the blade it is only necessary to reverse the direction of rotation of the turn-buckle, thus loosening the bolts and permitting the arms 9 of the yoke to spring outward until the teeth have become disengaged after which readjustment of the blade may be easily effected.

As will be readily understood from the foregoing description when taken in connection with the drawings hereto annexed the invention herein described is susceptible of a variety of modifications. Thus, for instance, blades of various shapes and forms such as triangular and crescent shaped blades might be used without departing from the spirit or scope of the invention.

Having thus described the invention, what is claimed is—

1. A hoe blade, having brackets provided with terminal eyes, the outer faces of which have radial serrations, a resilient yoke, the arms of which are provided with correspondingly serrated terminal eyes, and connecting means including right and left threaded bolts extending through the eyes, and a turn-buckle engaging the bolts.

2. In a hoe, a resilient yoke having its arms provided with terminal eyes radially serrated upon their inner faces, a blade having brackets provided with correspondingly serrated terminal eyes, right and left threaded bolts extending through the eyes, and a turn-buckle consisting of an externally milled tube having terminal threads engaging the bolts.

3. In a hoe, a resilient yoke having a prong and the arms of which are provided with terminal eyes having radially serrated faces, a blade having brackets provided with correspondingly serrated terminal eyes, right and left threaded bolts extending through the eyes, and a turn-buckle engaging the bolts to draw the serrated pairs of eyes into locking engagement.

In testimony whereof I affix my signature in presence of two witnesses.

JOHN C. BILSLAND.

Witnesses:
WILLIAM P. BARNES,
ANDREW E. THOMPSON.